United States Patent
Vastmans et al.

(10) Patent No.: US 6,853,796 B2
(45) Date of Patent: Feb. 8, 2005

(54) CABLE TERMINATION DEVICE WITH A CLAMPED RETENTION MEMBER

(75) Inventors: Kristof Vastmans, Leuven (BE); Sam Leeman, Leuven (BE); Peter Eyckmans, Lummen (BE)

(73) Assignee: Tyco Electronics Raychem N.V., Kessel-Lo (BE)

( * ) Notice: Subject to any disclaimer, the term of this patent is extended or adjusted under 35 U.S.C. 154(b) by 0 days.

(21) Appl. No.: 10/471,192

(22) PCT Filed: Mar. 14, 2002

(86) PCT No.: PCT/GB02/01171

§ 371 (c)(1),
(2), (4) Date: Sep. 9, 2003

(87) PCT Pub. No.: WO02/073281

PCT Pub. Date: Sep. 19, 2002

(65) Prior Publication Data

US 2004/0086254 A1 May 6, 2004

(30) Foreign Application Priority Data

Mar. 14, 2001 (GB) .............................. 0106231

(51) Int. Cl.⁷ ................................................ G02B 6/00
(52) U.S. Cl. ..................................................... 385/136
(58) Field of Search ............................. 385/87–91, 92, 385/93, 94, 136

(56) References Cited

U.S. PATENT DOCUMENTS 4,818,057 A    4/1989   Bruch

| 5,166,997 A | 11/1992 | Norland et al. |
| 5,696,864 A | 12/1997 | Smith et al. |
| 5,754,724 A | 5/1998 | Peterson et al. |
| 5,790,741 A | 8/1998 | Vincent et al. |
| 6,695,491 B1 * | 2/2004 | Leeman et al. ............... 385/87 |

FOREIGN PATENT DOCUMENTS

| DE | 26 21 936 | 12/1977 |
| DE | 43 41 608 | 11/1994 |
| DE | 94 15 327.2 | 1/1995 |
| EP | 0 581 306 | 2/1994 |
| WO | WO 00/75704 | 12/2000 |

OTHER PUBLICATIONS

British Search Report under Section 17, Jul. 19, 2001, GB 0106231.4.

International Search Report, PCT/GB02/01171.

* cited by examiner

Primary Examiner—Chandrika Prasad
(74) Attorney, Agent, or Firm—Myers Bigel Sibley & Sajovec, P.A.

(57) ABSTRACT

A termination device (1) for cables (20) having at least one flexible strength member (21) comprises a retention member (3) for retaining the strength member and a base member (2) for accommodating the retention member (3). The base member (2) is provided with clamping means (11, 12) which prevent any longitudinal movement of the retention member (3). In addition, the clamping means (11, 12) exert pressure on the retention member accommodated in the base member so as to be able to clamp the strength member (21) between the clamping means and at least one surface (7) of the retention member.

36 Claims, 1 Drawing Sheet

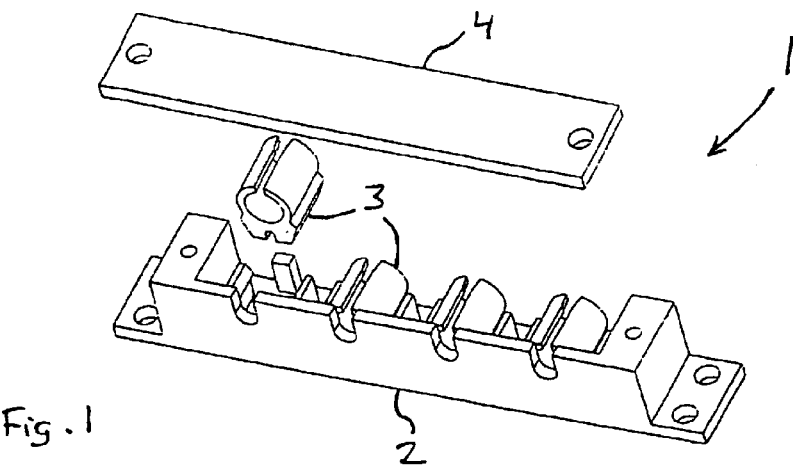
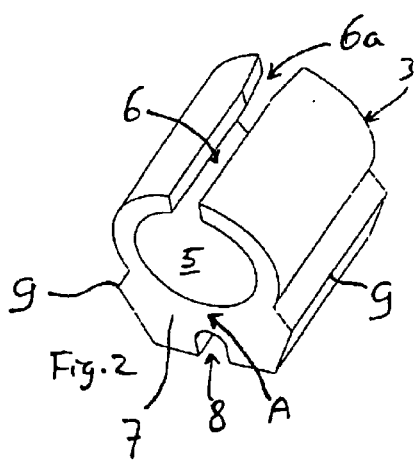
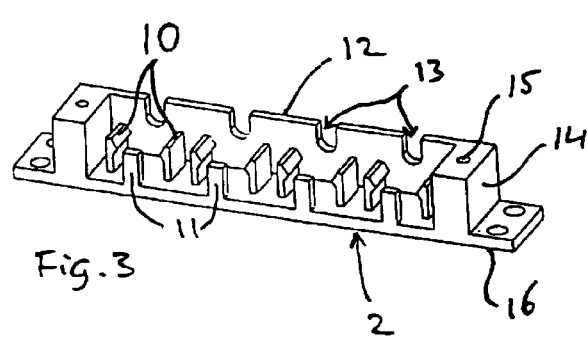
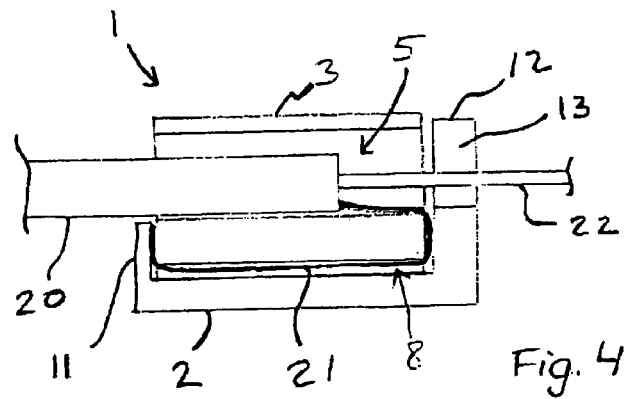

CABLE TERMINATION DEVICE WITH A CLAMPED RETENTION MEMBER

RELATED APPLICATIONS

The present application is a National Phase application of PCT/GB02/01171 filed on Mar. 14, 2002 and published in English, which claims priority from Application GB 0106231.4 filed on Mar. 14, 2001.

FIELD OF THE INVENTION

The present invention relates to a cable termination device. More in particular, the present invention relates to a termination device for cables having a flexible strength member, such as optical fibre cables.

BACKGROUND OF THE INVENTION

It will be understood that the term "cable" as used in this document is intended to include structures having a single optical fibre, a plurality of optical fibres, or a combination of at least one optical fibre and at least one copper wire. These structures are provided with a flexible strength member (e.g. made of KEVLAR®, a commercially available aramid fibre) and are usually provided with a protective sleeve. In particular, so-called "pigtails", cables used for interconnecting within optical fibre management racks contain one or more optical fibres and a flexible strength member contained in a sleeve.

Cable termination devices are well known. An example of such a device is disclosed in International Patent Application WO 00/72072 (Tyco Electronics). This known device, which includes a break-out member for optical fibres, is designed for cables having relatively rigid strength members.

International Patent Application WO 00/75704 (Tyco Electronics) discloses a detent for optical fibres. A tapered engagement member is slidably fitted in a tapered aperture of a housing. A flexible strength member of an optical fibre cable is clamped by the slidable engagement member when the optical fibre cable is pulled. The clamping action of this known device therefore relies on the tapered member moving in its longitudinal direction due to axial pulling forces transmitted by the optical fibre cable.

Although cable termination devices of the type disclosed in WO 00/75704 are very effective, they have the disadvantage that the position of the cable end is not well defined. That is, the clamping of the strength member is caused by the longitudinal movement of the slidable engagement member, resulting in longitudinal movement of the cable end. For many applications, however, it is preferable to fix the cable end in a certain position. In addition, it is often desirable to have a permanent clamping force rather than one which depends on any pulling of the cable.

U.S. Pat. No. 4,818,057 discloses an optical fibre cable termination comprising cable clamps and a separate arrangement for gripping the strength member of the cable. This gripping arrangement consists of a support plate around which the strength member is wound and a pinch plate having tabs which are bent down to pinch the support plate. The strength members are guided through a recess in the front of the support plate and are clamped between the two plates. The bending of the tabs, which effects the clamping, makes it difficult to release this known arrangement without causing any damage.

SUMMARY OF THE INVENTION

It is therefore an object of the present invention to provide a cable termination device which eliminates any disadvantages of the Prior Art and which secures a cable end in a fixed position.

It is another object of the present invention to provide a cable termination device which consists of few parts.

It is a further object of the present invention to provide a cable termination device which is easy to apply.

In order to meet these and other objects, the present invention provides a termination device for cables having at least one flexible strength member, the device comprising at least one retention member for accommodating an end of a cable and a base member for receiving the retention member, characterised in that the base member is provided with clamping means for preventing any longitudinal movement of the retention member, the clamping means exerting pressure on the retention member accommodated in the base member so as to be able to clamp the strength member between the clamping means and at least one surface of the retention member. That is, the device of the present invention has a retention member the position of which is fixed by the clamping means. In addition, the clamping means provide a permanent clamping pressure, independent of any pulling forces.

In a preferred embodiment the clamping means comprise a resilient tab extending from a base plate of the base member. Thus the permanent clamping force or pressure is provided by the resilient tab. In such an embodiment the clamping means may further comprise a wall extending from a base plate of the base member. However, embodiments may be envisaged in which the retention member is clamped between two resilient tabs instead of between one resilient tab and a relatively rigid wall.

Preferably, the wall is provided with slots for passing through cable elements. Advantageously, the base member is provided with engagement hooks for engaging the retention member. It is preferred that the engagement hooks are releasable, thus providing a termination device from which cables can be easily removed.

In a preferred embodiment, the retention member is provided with an open-sided channel extending between a front face and a back face of the retention member. This channel, which is preferably situated in a lower face of the retention member, allows the strength member of the cable to be passed from the back face to the front face of the retention member without taking up space on the outside of said member. This makes it easier to position a retention member in which a strength member is received and decreases the clamping force required by the engagement hooks.

In the preferred embodiment, therefore, the strength member(s) is/are not clamped between the lower face of the retention member and the upper face of the base member, but between the front face of the retention member and the clamping means, possibly also between the back face of the retention member and the clamping means. In this way, the clamping force is exerted on the strength member(s) in the longitudinal direction of the terminated cable.

Preferably, the retention member is provided with a longitudinal through-hole for passing through a cable. Preferably, the retention member is provided with a slit extending over the entire length of the through-hole so as to provide side-entry. Advantageously, the slit has, at one end, a widened portion to facilitate side-entry.

The present invention further provides a kit-of-parts for forming a termination device as defined above.

BRIEF DESCRIPTION OF THE DRAWINGS

The present invention will further be explained below with reference to the accompanying drawings, in which:

FIG. 1 shows, in perspective, a partially disassembled device according to the present invention.

FIG. 2 shows, in perspective, a retention member of the device of FIG. 1.

FIG. 3 shows, in perspective, a base member of the device of FIG. 1.

FIG. 4 shows, in cross-sectional view, part of a device according to the present invention in which a cable is terminated.

DETAILED DESCRIPTION OF EMBODIMENTS OF THE INVENTION

The device 1 shown in FIG. 1 merely by way of non-limiting example comprises a base member 2, several retention members 3 and a removable lid 4. The base member 2 serves to receive the retention members 3 and to define their positions. In the example shown, the base member is designed to receive four retention members 3, but it will be understood that the invention is not limited to this particular number and that the device of the present invention may be provided with, for example, only a single retention member 3, or two retention members, or more than four retention members.

As shown in FIG. 2, a retention member 3 of the present invention has a central longitudinal opening or through-hole 5 in which a cable end can be accommodated (it is noted that the longitudinal direction of the retention member is defined by the direction in which a cable may be accommodated in said member). A longitudinal slit 6 allows side-entry of the strength member(s) and optical fibre(s) of the cable end, making the device "wrap-around". An (optional) widened portion 6a of this slit 6 facilitates the insertion of these cable members.

The opposite face of the retention member 3 is provided with a longitudinal channel 8 which serves to accommodate one or more strength members of the cable, as will be explained later. The channel 8 extends between the front face 7 and the back face (not shown) of the retention member. Protrusions 9 on both sides of the retention member 3 are designed to be engaged by engagement hooks 10 of the base member 2.

The base member 2 shown in FIG. 3 comprises a base plate 16 from which a front wall 12, side walls 14, engagement hooks 10 and pressure tabs 11 extend. The front wall 12 is provided with slots 13 for passing optical fibres and/or other cable elements.

Each pair of engagement hooks 10 is designed to accept therebetween a retention member 3 and to engage its protrusions 9 (see FIG. 2). Longitudinal movement of the engaged retention member is prevented by the front wall 12 and the pressure tab 11, the latter of which does not extend beyond the lower edge of the opening 5 (see FIG. 2).

A lid 4 (see FIG. 1) is preferably provided to further secure the retention members 3 and to close off the slots 13, thus retaining the cable elements. The lid 4 may be fastened by suitable fastening means, such as screws (not shown) accommodated in screw-threaded openings 15 (FIG. 3).

In use, a cable 20 is inserted into a retention member 3. When the cable has a relatively small diameter or when the cladding has been removed from the end part of the cable, side-entry of the cable is possible through the slit 6. The flexible strength member 21 of the cable is then folded back, around the front face 7 of the retention member 3, through the channel 8 and up the back face towards the opening 5. Subsequently, the retention member is inserted in the base member 2, the pressure tab 11 pressing against the back face. The strength member 21 is thereby clamped by the front face 7 and the front wall 12, clamping pressure being exerted on the retention member by the pressure tab 11. The part of the front face 7 where the strength member is clamped is indicated by "A" in FIG. 2. It has been found that a relatively light pressure is sufficient to secure the strength member.

As shown in FIG. 4, a cable 20 may be accommodated in the through-hole 5 of the retention member 3. An optical fibre 22 is passed through a slot 13 in the wall 12. The strength member 21 of the cable 20 is guided around the retention member through the channel 8, passing across at least one of the back face and the front face of the retention member 3. Due to the pressure exerted by the relatively resilient tab 11 the strength member 21 is secured.

As will be clear from the above description, the cable termination device of the present invention comprises a very small number of parts, thus reducing both manufacturing and installation costs. In particular, several (four in the example illustrated) retention members 3 may be accommodated in a single base member 2, eliminating the need for a large number of separate base members. According to an important further aspect of the present invention, the base member 2 may be integral with the device on which it is to be mounted, thus further reducing the number of parts. Accordingly, the present invention further provides an optical fibre organiser having an integral base member of a cable termination device as described above.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A termination device for cables having at least one flexible strength member, the termination device comprising at least one retention member for accommodating an end of a cable and a base member for receiving the at least one retention member, wherein the base member is provided with clamping means for preventing any longitudinal movement of the retention member, the clamping means being adapted to maintain a clamping pressure on the retention member accommodated in the base member in use so as to clamp the strength member between the clamping means and at least one surface of the retention member.

2. A termination device according to claim 1, wherein the clamping means comprise a resilient tab extending from a base plate of the base member.

3. A termination device according to claim 1, wherein the clamping means comprise a wall extending from a base plate of the base member.

4. A termination device according to claim 3, wherein the wall is provided with slots for passing through cable elements.

5. A termination device according to claim 1, wherein the base member is provided with engagement hooks for engaging the retention member.

6. A termination device according to claim 1, wherein the base member is provided with a lid.

7. A termination device according to claim 1, wherein the retention member is provided with an open-sided channel extending between a front face and a back face of the retention member for accommodating the strength member.

8. A termination device according to claim 1, wherein the retention member is provided with a longitudinal through-hole for accommodating a cable.

9. A termination device according to claim 8, wherein the retention member is provided with a slit extending over the entire length of the through-hole so as to provide side-entry for at least the strength member.

10. A termination device according to claim 9, wherein the slit has, at one end, a widened portion to facilitate side-entry.

11. A termination device according to claim 5, wherein the retention member is provided with protrusions to facilitate engagement by the engagement hooks.

12. A termination device according to claim 1, wherein the clamping means are arranged to exert a clamping pressure in a longitudinal direction of the retention member.

13. A termination device according to claim 1, wherein the base member is arranged to accommodate at least two retention members.

14. A termination device according to claim 1, wherein:
   a) the retention member has front and back opposed faces spaced apart along a longitudinal axis;
   b) the base member comprises a base plate including the clamping means; and
   c) the clamping means includes a first wall positioned adjacent the front face and a second wall positioned adjacent the back face so as to hold the retention member in a predetermined longitudinal position.

15. A termination device according to claim 14, wherein the second wall is a resilient tab extending from the base plate.

16. A termination device according to claim 5, wherein the engagement hooks are releasable.

17. A termination device according to claim 6, wherein the lid is removable.

18. A termination device according to claim 13, wherein the base member is arranged to accommodate at least four retention members.

19. A termination device for a cable having at least one flexible strength member, the termination device comprising:
   a) at least one retention member adapted to accommodate an end of the cable; and
   b) a base member adapted to receive the at least one retention member, wherein the base member includes at least one clamping structure to limit movement of the retention member along a longitudinal axis, the at least one clamping structure being adapted to maintain a clamping pressure on the retention member accommodated in the base member in use so as to clamp the strength member between the at least one clamping structure and at least one surface of the retention member.

20. A termination device according to claim 19, wherein:
   a) the retention member includes front and back opposed faces spaced apart along the longitudinal axis;
   b) the base member comprises a base plate including the at least one clamping structure; and
   c) the at least one clamping structure includes a first wall positioned adjacent the front face and a second wall positioned adjacent the back face so as to bold the retention member in a predetermined longitudinal position.

21. A termination device according to claim 20, wherein the second wall is a resilient tab extending from the base plate.

22. A termination device according to claim 20, wherein each of the first and second walls extends from the base plate.

23. A termination device according to claim 20, wherein the first wall is provided with slots for passing through cable elements.

24. A termination device according to claim 20, wherein the base member is provided with engagement hooks for engaging the retention member.

25. A termination device according to claim 24, wherein the engagement hooks are releasable.

26. A termination device according to claim 24, wherein the retention member is provided with protrusions to facilitate engagement by the engagement hooks.

27. A termination device according to claim 20, wherein the base member is provided with a lid.

28. A termination device according to claim 27, wherein the lid is removable.

29. A termination device according to claim 20, wherein the retention member is provided with an open-sided channel extending between a front face and a back face of the retention member for accommodating the strength member.

30. A termination device according to claim 20, wherein the retention member is provided with a longitudinal through-hole for accommodating a cable.

31. A termination device according to claim 30, wherein the retention member is provided with a slit extending over the entire length of the through-hole so as to provide side-entry for at least the strength member.

32. A termination device according to claim 31, wherein the slit has, at one end, a widened portion to facilitate side-entry.

33. A termination device according to claim 20, wherein at least one clamping structure is arranged to exert a clamping pressure in a longitudinal direction of the retention member.

34. A termination device according to claim 20, wherein the base member is arranged to accommodate at least two retention members.

35. A termination device according to claim 1, wherein the clamping means includes a resilient member adapted to maintain the clamping pressure on the retention member accommodated in the base member so as to clamp the strength member between the clamping means and the at least one surface of the retention member.

36. A termination device according to claim 19, wherein the at least one clamping structure includes a resilient member adapted to maintain the clamping pressure on the retention member accommodated in the base member so as to clamp the strength member between the at least one clamping means and the at least one surface of the retention member.

* * * * *